(12) United States Patent
Decker

(10) Patent No.: US 10,445,337 B2
(45) Date of Patent: Oct. 15, 2019

(54) KEY VERSIONING FOR BUSINESS OBJECTS

(71) Applicant: SAP SE, Walldorf (DE)

(72) Inventor: Thomas Decker, Bad Shoenborn (DE)

(73) Assignee: SAP SE, Walldorf (DE)

( * ) Notice: Subject to any disclaimer, the term of this patent is extended or adjusted under 35 U.S.C. 154(b) by 418 days.

(21) Appl. No.: 15/351,784

(22) Filed: Nov. 15, 2016

(65) Prior Publication Data

US 2018/0137182 A1 May 17, 2018

(51) Int. Cl.
G06F 7/00 (2006.01)
G06F 17/30 (2006.01)
G06F 16/25 (2019.01)

(52) U.S. Cl.
CPC .................. *G06F 16/258* (2019.01)

(58) Field of Classification Search
CPC ...... G06F 16/258; G06F 16/84; G06F 16/288; G06F 16/9024; G06F 17/30569; G06F 17/30893
See application file for complete search history.

(56) References Cited

U.S. PATENT DOCUMENTS

| | | | |
|---|---|---|---|
| 6,529,948 B1 * | 3/2003 | Bowman-Amuah | G06F 9/4493 709/217 |
| 7,587,705 B2 | 9/2009 | Benjes et al. | |
| 7,634,771 B2 | 12/2009 | Benjes et al. | |
| 7,669,181 B2 | 2/2010 | Benjes et al. | |
| 8,689,179 B2 | 4/2014 | Remmel et al. | |
| 2008/0189438 A1 | 8/2008 | Zimmerer et al. | |
| 2011/0208695 A1 | 8/2011 | Anand et al. | |
| 2016/0092499 A1 * | 3/2016 | Leigh | G06F 16/2379 707/740 |
| 2018/0137183 A1 | 5/2018 | Decker | |

OTHER PUBLICATIONS

Non-Final Office Action issued in U.S. Appl. No. 15/351,806 dated Apr. 16, 2019, 16 pages.

* cited by examiner

*Primary Examiner* — Azam M Cheema
(74) *Attorney, Agent, or Firm* — Fish & Richardson P.C.

(57) ABSTRACT

A computerized method, system and medium for providing compatibility between systems associated with incompatible object key domains, where a first system is associated with a legacy key domain and a second system with an extended key domain relative to the first system. One example method can include receiving a request associated with a business object instance, wherein the request includes a first logical object key in a legacy format from the first system. The first logical key is converted from the legacy format into a second object key in an extended format. The request is processed and a response is generated based on the processing of the business object instance and includes the second object key, which is converted into the first logical key of the first system prior to sending the response to the received request to the first system. The generated response is sent to the first system.

18 Claims, 6 Drawing Sheets

KEY VERSIONING FOR BUSINESS OBJECTS

CROSS REFERENCE TO CO-PENDING APPLICATION

This application is related to a Co-Pending Application with a U.S. patent application Ser. No. 15/351,806 filed on Nov. 15, 2016, entitled "Key Versioning for Business Objects", the entire contents of which are hereby incorporated by reference.

TECHNICAL FIELD

The present disclosure relates to computer systems and computer-implemented methods for extending a business object domain by adapting key fields associated with one or more business objects between domains.

Instances of business object types are identified by the values of their key fields. Key fields may represent one or more fields included in a business object which have been identified as providing unique combinations when those fields are combined into a concatenated form. The logic of business objects implements a bijective mapping between the key domain and the domain of business entities. Changes to the key fields in different systems, including by an extension to one of the existing key fields in a particular object key, can cause disruption and errors in interactions between multiple systems.

SUMMARY

The disclosure generally describes computer-implemented methods, software, and systems for extending a business object domain by adapting key fields associated with one or more business objects between domains are described. The operations may be used for providing compatibility between systems associated with incompatible object key domains, where a first system is associated with a legacy key domain and a second system with an extended key domain relative to the first system. An example method includes receiving a request associated with a business object instance, wherein the request includes a first logical object key in a legacy format from the first system. The first logical key is converted from the legacy format into a second object key in an extended format. The request is processed and a response is generated based on the processing of the business object instance and includes the second object key, which is converted into the first logical key of the first system prior to sending the response to the received request to the first system. The generated response is then sent to the first system.

While generally described as computer implemented software embodied on tangible media that processes and transforms the respective data, some or all of the aspects may be computer implemented methods or further included in respective systems or other devices for performing this described functionality. Specifically, particular implementations of described methods and systems can include corresponding computer systems, apparatuses, or computer programs (or a combination of computer systems, apparatuses, and computer programs) recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
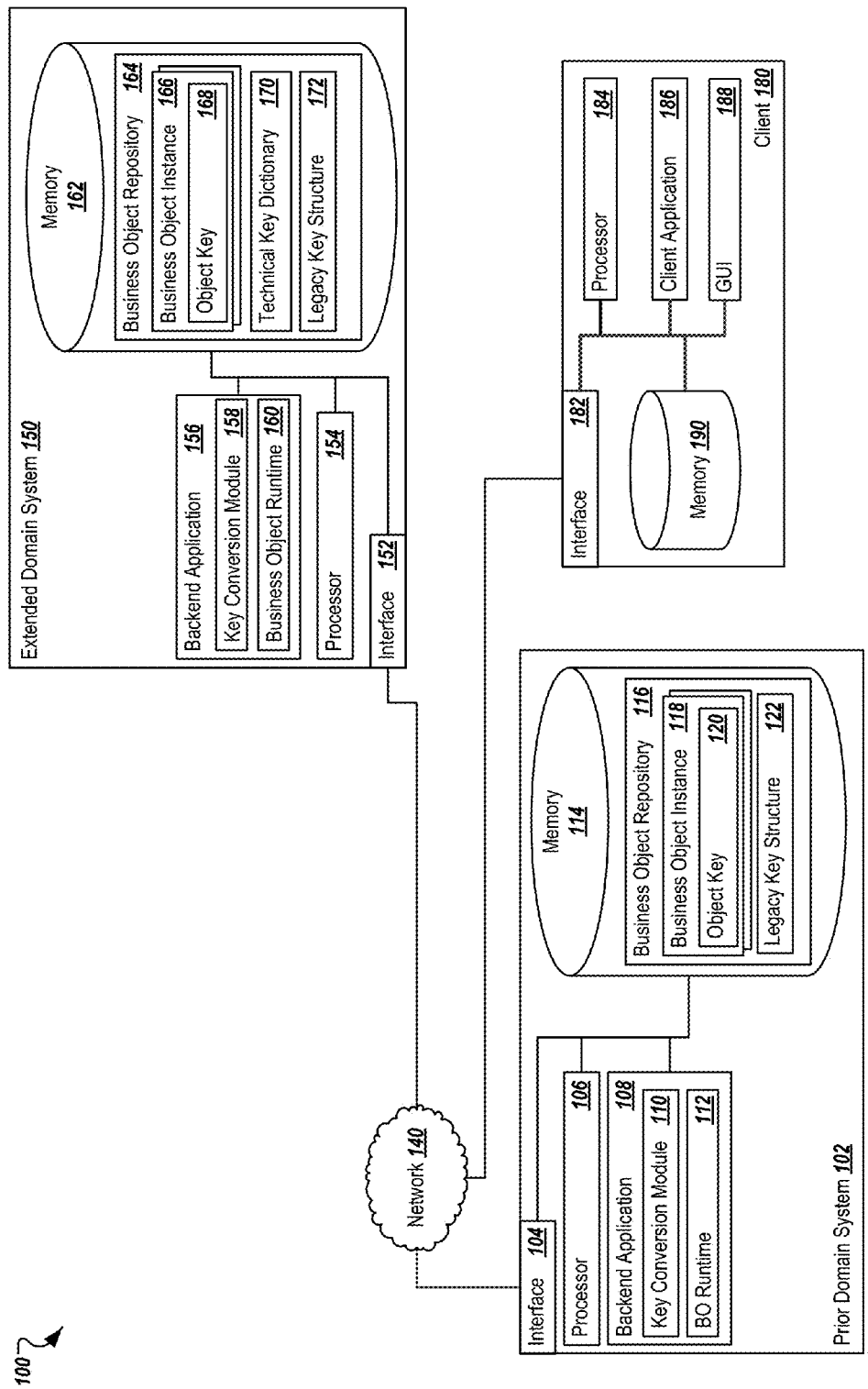
FIG. 1 is a block diagram illustrating an example system for enabling extension of a business object domain by adapting key fields associated with one or more business objects between domains.

This present disclosure generally describes computer-implemented methods, software, and systems for extending a business object domain by adapting key fields associated with one or more business objects between domains. Extending the business object domain, for example, by increasing the length of a material number or another particular field in a business object, requires an adaptation of the key domain in order to be able to address all business entities. Adaptations must be done in a way such as not to invalidate keys of the former domain while still allowing interaction between those domains. Domain extensions may also change the way particular object types are used. For example, the types of method parameters used to perform a method associated with a particular business object may change. To extend the domains, it must be ensured that the methods can be called by systems that refer to the original domain as well as by systems that already work with the extended domain. These problems can be addressed by the currently described solution for providing object type versions and the use of logical and technical keys.

In practice, the version of an object type may be increased for any number of reasons. Two such reasons may include where (1) key attributes are changed incompatibly and (2) where parameters of methods are changed in an incompatible way (e.g., if structured parameters are used and particular fields of the reference structure are changed). In the present solution, existing business object repositories have the ability to distinguish former and new object keys. Using the existing functionality, the business object repositories associated with different systems can be used to effectively manage the conversion of object keys into the version associated with different applications and domains. In general, a business object repository includes methods and definitions associated with different business object and interface types, including references to particular business objects and/or object instances associated with particular applications. In general, the business object repository can provide an access point to the business objects and interfaces for external applications and systems requesting access to particular information. The business object repository can perform many functions, including defining and describing business objects, interface types, and their associated application programming interfaces (APIs, or for business application programming interfaces, BAPIs). Details of the business object types or interface types, their key fields, and their BAPI methods can be retrieved from the business object repository, which contains the information needed to integrate the correct object type definitions and BAPI calls into application program. A business object runtime can be used to create and manage instances of particular business objects, where the business object runtime can receive requests to create runtime objects from client applications and create the appropriate object instances for use in local and remote applications. When extending key fields associated with a particular logical key (e.g., by expanding the size of a particular key field), issues may arise without further considerations and adjustments. For example, if an external application requests business objects using a different object key version than expected, errors may be generated and received and the particular business objects may not be correctly instantiated or used.

In current solutions, object keys associated with particular business objects in existing systems may be limited to a particular pre-defined size limit, such as 70 characters. Object keys are represented as a combination and/or concatenation of two or more key fields identified for the business object, where the combination of those fields uniquely identify the business object instance. In the present solution, a small portion of those characters can be reserved for a version number or identifier, where the version number can be passed among systems to identify the current domain context of a particular application or domain before preparing an outgoing request for a business object (or instance thereof) or attempting to process a received incoming request for a business object (or instance thereof). Because the version number or identifier is included within the object key (now referred to as a logical key), the key fields portion of the object key must be limited to a size of the full pre-defined size limit of the key minus the size of the version number. In an example used throughout this description, the pre-defined size of the key may be considered 70 characters, the version identifier or number portion of the key may be 4 characters, and the key fields portion of the object key may be limited to 66 characters. In some instances, object keys may already have a key field size greater than 66 characters (or another pre-defined maximum), and may therefore be unable to include the version identifier. In those instances, a new globally unique identifier (GUID) may be used to represent any version of those keys where the extended key exceeds that threshold. The GUID associated with the object key can be used in updated systems where the GUID is needed, while a corresponding logical object key below the size limitations can be used in prior version or legacy systems.

The conversion between different versions of particular object keys can be performed by the relatively higher versioned system or domain, thereby avoiding the need to notify or update prior systems with information about later version changes. In some instances, the conversion may be performed by a key conversion component of or associated with the business object runtime and business object repository. Further, in some instances, that key conversion component can perform a check of the current key version for a particular domain before sending information to or receiving information from another domain. Where a determination is made that the calling domain or application is associated with a higher version than the called domain or system, the key conversion component or module can adapt the object key into a lower version associated with the called domain/system prior to sending the request. Where a determination is made that the calling domain or application is associated with a lower version relative to the called domain or system, the key conversion component or module at the called domain or system can perform the adaptation of the object key into the higher version associated with the called domain/system after receiving the request.

Once the versions are identified and the appropriate conversions have been made, the two systems may be considered synchronized such that communication between them can be used in a simplified manner, where going forward in the current interactions the compatible keys are passed between the two different systems. The mappings between the updated and legacy versions of the keys can be performed automatically once synchronized, allowing suitable communication and processing in the inter-system operations.

Turning to the illustrated embodiment, FIG. 1 is a block diagram illustrating an example system 100 for enabling extension of a business object domain by adapting key fields associated with one or more business objects between domains. As illustrated, system 100 includes a legacy or prior domain system 102 using an earlier or lower version of a particular object type, an extended domain system 150 using a relatively higher version of a particular extended object type (e.g., based on extended or newly added key fields), and a client 180, where these systems are connected, at least in part, by network 140. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate. For example, a plurality of domain and systems may be present in various implementations, wherein various version levels may be present. For example, three different systems may be present, where two of the systems are at the same current key version level, while one of the systems is associated with a legacy key version. In those instances, no conversions may be necessary between the two same-level systems, while conversions in interactions with the third system will be necessary. Further, in the three system example all three systems may be associated with different version levels such that each system has a different domain. Therefore, any such interactions between those systems would require conversion to allow for interactions with various object key versions. Any other suitable combination of systems and version levels are contemplated by the present disclosure, including any number of version levels and any number of systems.

As used in the present disclosure, the term "computer" is intended to encompass any suitable processing device. For example, client 180, prior domain system 102, and extended domain system 150, among other illustrated and non-illustrated components, may be any computer or processing device such as, for example, a blade server, general-purpose personal computer (PC), Mac®, workstation, UNIX-based workstation, smartphone, tablet, or any other suitable device. Moreover, although FIG. 1 illustrates the various elements individually (e.g., the domain system 102 and domain system 150), any such systems can be implemented using two or more systems, as well as computers other than servers, including a server pool. Alternatively, the functionality provided by some portions of the system 100 may be included (in whole or in part) at one or more other components within the system 100. In some instances, the network 140 may provide cloud-based solutions for any of the elements, as well as other suitable combinations and permutations. The present disclosure contemplates computers other than general purpose computers, as well as computers without conventional operating systems.

In general, the prior domain system 102 and the extended domain system 150 may be any system associated with one or more backend applications 108, 156, respectively, where the backend applications 108, 156 include the use and application of one or more business object instances 118, 166 in their operations. As illustrated, the backend applications 108, 156 can include or be associated with a business object runtime 112, 160 that manage particular business objects and business object instances 118, 166 within a business object repository 116, 164 (e.g., in memory 114, 162). The business object runtime 112, 160 can manage instantiations of particular business objects in the present domain system (e.g., business object runtime 160 manages instances in the extended domain system 150) and can correspond and interact with other business object runtimes 112, 160 in one or more other systems through which calls and interactions take place. Here, the business object runtime 160 of the extended domain system 150 can correspond and interact with business object runtime 112 of the prior domain system 102, allowing information about particular business objects and business object instances 118, 166 to be passed between the systems.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

In general, a business object can be used in object-oriented programming as an actor within a business layer of a computer program or application, where the business object represents a part of a business, enterprise, or organization and/or an item within it. Example data objects can include a Sales Order object, a Customer object, a Supplier object, an Address object, and the like. In some examples, each business object defines a data structure including one or more attributes of the respective object, a data value being provided for each attribute. In some examples, each business object includes an object key. For example, metadata of the business object can identify a particular attribute or set of attributes as the primary object key for the particular object. In some examples, data for the business object is stored in one or more database tables. For example, when a business object is accessed, data can be retrieved from a database table (table) to populate the business object. In some implementations, a business object references other business objects. For example, a Sales Order object can reference a Customer object, e.g., the customer that made a purchase captured in the sales order. Consequently, a chain of business objects can be provided.

Each business object and its business object instances are associated with an object key (e.g., object key 120, 168), where each object key uniquely identifies a particular business object instance based on a combination/concatenation of one or more key fields of information or data included in the business object instance. Therefore, as illustrated, particular business object instances (e.g., business object instance 118, 166) are identified by their corresponding object key (120, 168, respectively). As described above, object keys 120, 168 may be specifically limited or restricted in size based on system requirements and design. In one example system, each object key 120, 168 may be restricted to 70 characters in total. To allow for the solution described herein, the pre-defined restricted character total may also be revised to include a version identifier, where the version identifier identifies, within the object key itself, the particular version of the present key.

Figure 2:
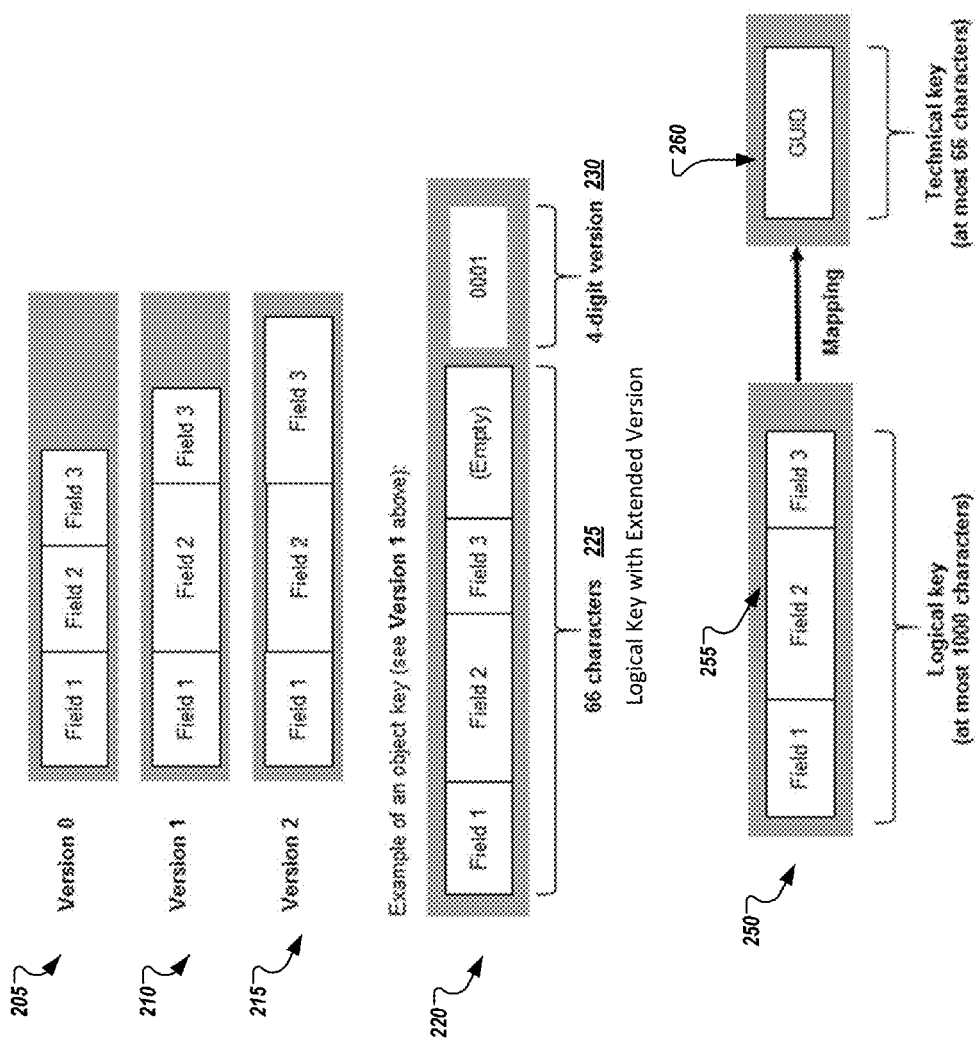
FIG. 2 is an illustration of example of a versioned set of object keys and their corresponding logical keys, as well as an example technical key converted from a logical key.

FIG. 2 is an illustration of an example of a versioned set of object keys and their corresponding logical keys, as well as an example technical key converted from a logical key. As illustrated, three versions of an example key are shown, Version 0 (205) is the lowest relative key version), Version 1 (210) is an extension of Version 0 (205) where Field 2 has been extended (e.g., increased in size), and Version 2 (215) is an extension of Version 1 (210) where an extension is also made to Field 3. In alternative instances, a new field may be added as a key field instead of simply extending an existing key field, wherein the new field is concatenated onto or into the existing key field. In order to manage these different versions, a uniform underlying logical key structure is provided, where a portion of the logical key includes a concatenation of key fields and, optionally, additional empty space (e.g., room for further expansion) up to a pre-defined size within the key and a version identifier portion. As illustrated in the logical key 220, 66 characters of the 70-character maximum are used as a key field portion (225) and store the key field information and any additional space that may be used in the future. The additional version identifier 230 can store a version identifier corresponding to the key version, which can reside in a short set of characters reserved—from the pre-defined full length of the object key—specifically for the version identifier 230. By reserving this space, the size of the key fields available is then limited to the pre-defined full length restriction minus the size of the version identifier 230. As the object key or a particular key field is extended in a system, the key fields are updated in the logical key and the version identifier is updated (e.g., incremented by 1). Information on the current and prior versions of the logical keys can be stored together for use in later conversions between systems, such as in legacy key structure 172.

Also in FIG. 2, an illustration of the type of key used when the extended key fields exceed their allocated size is provided. Specifically, when the key fields of a particular object key version are extended to a size beyond the maximum key field portion 225 size, a technical key is used instead of the existing logical key. As illustrated by 250, the unique key field combination 255 for a particular version is mapped to a unique technical key 260, which is represented by a Globally Unique Identifier (GUID). The mapping mechanism may be managed by a business object runtime, a key conversion module, or another suitable mechanism, and use a technical key dictionary that links GUIDs/technical keys to particular logical keys (and logical key versions). In some instances, the technical key 260 may be associated with a particular version of the object key, which may be included in or referenced in the mapping and/or the technical key dictionary. The technical key 260 can be used to instantiate a particular business object in response to a request from a relatively lower version system or in an initial instantiation prior to requesting a particular business object instance from another system. However, once instantiated, the actual key fields and their associated values are used for further processing within the system.

Returning to FIG. 1, the object keys 168 may be a newer, or relatively higher, version in the extended domain system 150 than the object keys 120 in a legacy version, such as prior domain system 102. To ensure compatibility between these keys, the backend application 156 of the extended domain system 150 can include a key conversion module 158, which uses knowledge regarding legacy systems and their corresponding key object versions from the legacy key structure 172. In communicating with a particular system (e.g., via one or more Application Programming Interfaces (APIs) of the backend application 156 and/or the business object runtime 160 and to the business object runtime 112 and/or backend application 108 of the prior domain system), an identification or handshake as to the respective key versions can be initially determined. Based on that handshake between the systems, the relatively higher version system can determine that it will perform the conversions necessary for the interactions to occur. In doing so, the extended domain system 150 can, prior to sending requests related to particular business object instances, convert its particular object keys 168 into the appropriate format for the relatively lower version of the object key 120 in the prior domain system 102. Similarly, as information about particular object keys 120 are received at the extended domain system 150 from the prior domain system 102, the received object keys 120 are converted by the key conversion module 158 into the extended domain version of the object key 168 prior to interactions being performed on particular business object instances 166. As described in FIG. 2, the technical key dictionary 170 may be included in the extended domain system 150 where particular key fields in one or more object keys 168 have been extended past a particular size restriction for logical keys. In those instances, the key fields are mapped to the technical key dictionary based on a GUID used to identify and reference the particular object keys 168 being referenced, instantiated, or otherwise called. In some instances, the prior domain system 102 may also include and/or use a key conversion module 110, particularly where the prior domain system 102 is at a relatively higher version than at least one other system (not shown). The key conversion module 110 can access a legacy key structure 122 that includes information on those prior versions. In some instances, the legacy key structure 122 of the prior domain system 102 may not include information on the extended domain system 150. The legacy key structure tables 122, 172 may each be a table, database, or any other file format that can include information on previous versions of particular object keys, and can ensure that the correct object key version is used when converting received object keys from relatively lower versions systems or when converted object keys to be sent to relatively lower version systems. The legacy key structure 172 may be located at the particular systems, or may be available remotely, such as in network 140 or at another suitable location. In some instances, multiple systems may access a shared legacy key structure for conversion and informational purposes.

As illustrated, the systems 102, 150 include interfaces 104, 152, processors 106, 154, and memories 114, 162. The interfaces 104, 152 are used by the respective systems for communicating with other systems in a distributed environment—including within the environment 100—connected to the network 140, e.g., the extended or prior systems 150, 102, client 180, as well as other systems communicably coupled to the network 140. Generally, the interfaces 104, 152 comprise logic encoded in software and/or hardware in a suitable combination and operable to communicate with the network 140. More specifically, the interfaces 104, 152 may comprise software supporting one or more communication protocols associated with communications such that the network 144 or interface's hardware is operable to communicate physical signals within and outside of the illustrated environment 100. The interfaces 104, 152 may be different or similar in various implementations.

Network 140 facilitates wireless or wireline communications between the components of the environment 100 (e.g., between the prior system 102 and the extended domain system 150, between the systems and client 180, as well as with any other local or remote computer, such as additional clients, servers, or other devices communicably coupled to network 140, including those not illustrated in FIG. 1). In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise of either a wireline or wireless link. Example wireless links may include 802.11a/b/g/n/ac, Bluetooth, Near Field Communication (NFC), 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The systems further include processors 106, 154. Although illustrated as single processors in FIG. 1, two or more processors may be used according to particular needs, desires, or particular implementations of the environment 100. Each processor 106, 154 may be a central processing unit (CPU), an application specific integrated circuit (ASIC), a field-programmable gate array (FPGA), or another suitable component. Generally, the processors 106, 154 execute instructions and manipulate data to perform the operations of their respective systems 102, 150. Specifically, the processors 106, 154 execute the algorithms and operations described in the illustrated figures, including the operations performing the functionality associated with the systems and respective backend applications 108, 156, generally, as well as the various software modules and operations, including the functionality for sending communications to and receiving transmissions from the various systems involved in the conversion of object keys between system to allow for compatibility between systems.

The respective systems 102, 150 also include memory 114, 162, or multiple memories in some instances. The memories 114, 162 may include any memory or database module(s) and may take the form of volatile or non-volatile memory including, without limitation, magnetic media, optical media, random access memory (RAM), read-only memory (ROM), removable media, or any other suitable local or remote memory component. In some instances, at least a portion of the memories 114, 162 may include an in-memory database. The memories 114, 162 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the respective systems. Additionally, the memories 114, 162 may store any other appropriate data, such as VPN applications, firmware logs and policies, firewall policies, a security or access log, print or other reporting files, as well as others. As illustrated, memories 114, 162 can store business object repositories 116, 164, legacy key structures 122, 172, and, for memory 162, the technical key dictionary 170, as well as any other information relevant to the respective systems.

Environment 100 includes one or more clients 180. Particular clients 180 may connect to any of the illustrated systems, and may include end users and administrators, among others. For purposes of the actions described herein, client 180 may connect to one or both of the prior domain system 102 and the extended domain system 150, where the client 180 and its client application 186 can interact with one or both of the backend applications 108, 156. During the client's interactions, one or more of the backend applications 108, 156 can initiate a cross-system call or request for information from one system to another, wherein the key conversion operations are performed in order to perform the actions. Each client 180 may be specifically associated with a particular user or multiple users. In other instances, clients 180 may be generally available computing systems accessible by a plurality of users. Client application 186 may include or be associated with a web browser, a remotely executed application associated with at least one of the backend applications 108, 156, or any other suitable application or component.

The illustrated client 180 is intended to encompass any computing device such as a desktop computer, laptop/notebook computer, mobile device, smartphone, personal data assistant (PDA), tablet computing device, one or more processors within these devices, or any other suitable processing device. In general, the client 180 and its components may be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer. In some instances, the client 180 may comprise a computer that includes an input device, such as a keypad, touch screen, or other device(s) that can interact with the client application 186, and an output device that conveys information associated with the operation of the applications and their application windows to the user of the client 180. Such information may include digital data, visual information, or a GUI 188, as shown with respect to the client 180. Specifically, the client 180 may be any computing device operable to connect to or communicate with either or both of the prior domain system 102 and the extended domain system 150 and their respective applications/functionality, other clients 180, and/or other components via network 140, as well as with the network 140 itself, using a wireline or wireless connection. In general, client 180 comprises an electronic computer device operable to receive, transmit, process, and store any appropriate data associated with the environment 100 of FIG. 1.

As illustrated, client 180 includes an interface 182, a processor 184, client application 186, a graphical user interface (GUI) 188, and memory 190. The interface 182 and processor 184 may be similar to or different than the other illustrated interfaces and processors of FIG. 1. In general, processor 184 executes instructions and manipulates data to perform the operations of the client 180. Specifically, the processor 184 executes the algorithms and operations described in the illustrated figures and associated with the client 180, including the operations performing the functionality associated with the client application 186. In some instances, the client 180 may be integrated with or may be a remotely executing component of either the backend application 108 or 156, as well as a remote portion of other software/systems of the prior or extended domain systems 102, 150. The processor 184 can manage such executions. Further, memory 190 may be similar to or different than the other memories described in FIG. 1. While illustrated generally, memory 190 may store or maintain information related to the client 180, as well as other suitable data.

GUI 188 of the client 180 interfaces with at least a portion of the environment 100 for any suitable purpose, including generating a visual representation of the client application 186. In particular, the GUI 188 may be used to view information associated with a particular backend application 108, 156, manage extension and management of one or more object keys and/or key fields, as well as other relevant actions. GUI 188 may also be used to view and interact with various Web pages and applications located local or external to the client 180. Generally, the GUI 188 provides the user with an efficient and user-friendly presentation of data provided by or communicated within the system. The GUI 188 may comprise a plurality of customizable frames or views having interactive fields, pull-down lists, and buttons operated by the user. In general, the GUI 188 is often configurable, supports a combination of tables and graphs (bar, line, pie, status dials, etc.), and is able to build real-time portals, application windows, and presentations. Therefore, the GUI 188 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 3:
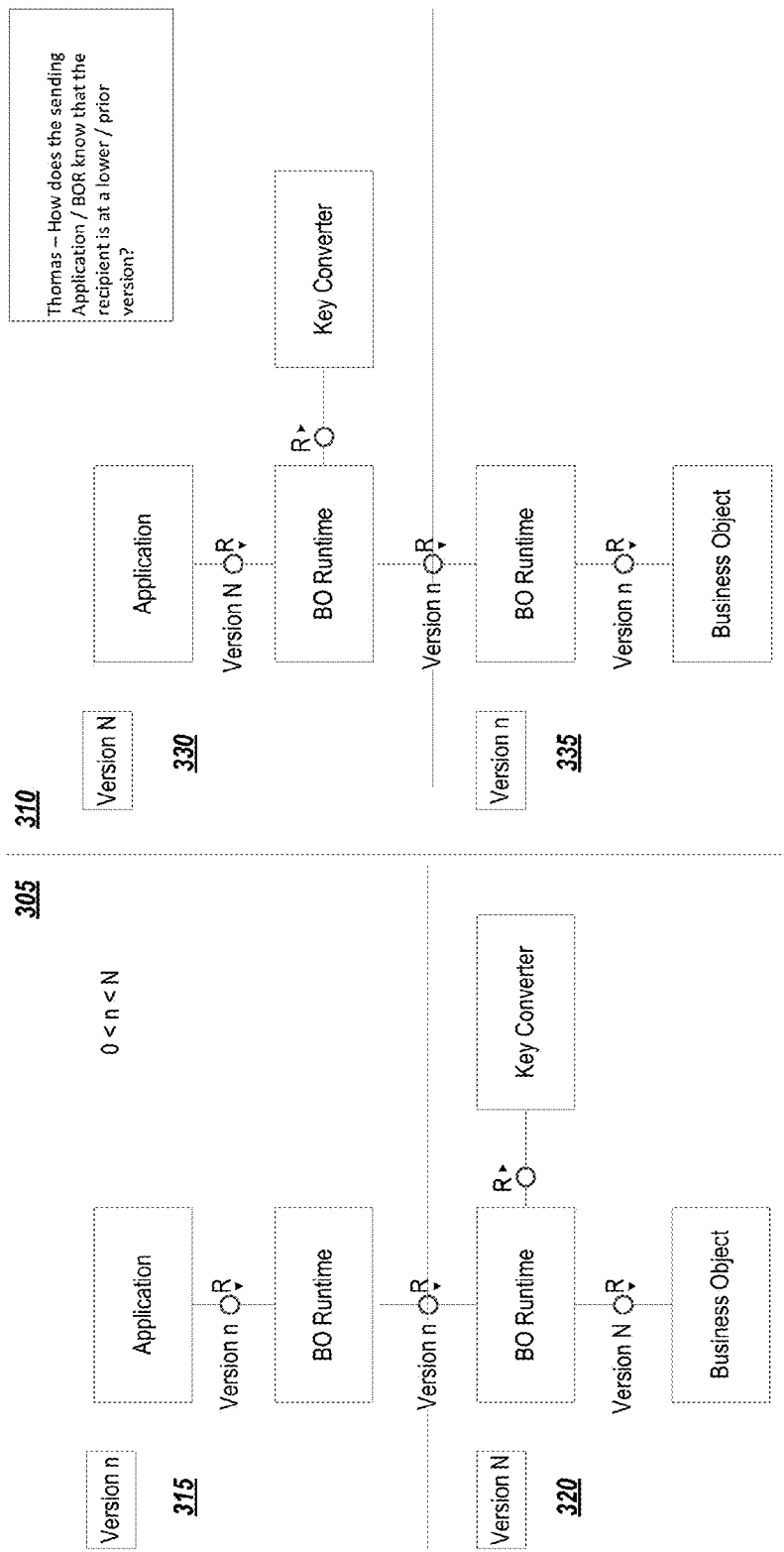
FIG. 3 illustrates a diagram of example operations for converting logical object keys for use between application domains having different key versions.

FIG. 3 illustrates a diagram of example operations for converting logical object keys for use between application domains having different key versions. Illustration 305 shows a conversion between two different logical key versions, where the conversion occurs at a receiving system. Illustration 310 shows a conversion between two different logical key versions, where the conversion occurs prior to sending the request at the sending system.

As illustrated in 305, system 315 has a relatively lower version (n) than system 320 (N, where 0<n<N) with whom a message is sent. Initially, systems 315 and 320 may perform a handshake operation to identify their respective versions. Based on that handshake, system 320 can understand (e.g., based on a legacy key structure table) the structure of object keys received from system 315, and can use that knowledge, as well as the knowledge of the extended domain used at system 320, to convert the object key before performing operations. In this instance, the application of system 315 determines that a business object instance associated with system 320 is needed for operations to continue. The business object runtime of system 315 communicates across system boundaries to the business object runtime of system 320 (e.g., via BO runtime API) to request a particular business object instance. The request in the communication provides the relevant object key as a logical key similar to those illustrated in FIG. 2, where the version identifier indicates that version n is being used. Upon receiving the request and logical key of version n, the business object runtime of system 320 interacts with the key converter module or component to obtain the converted object key. In this instance, the key converter can convert the received logical key of version n into an extended logical key of version N and provide that version back to the business object runtime. The business object runtime, now using the extended version of the domain used by system 320, can access, instantiate, and/or otherwise interact with the corresponding business object or business object instance. Conversely, when system 320 sends a responsive message back, or when the response is returned, the logical key of version N is converted back to the logical key of version n for communication back to system 315.

Illustration 310 shows a similar interaction, but where system 330 is a relatively higher version N and system 335 is a relatively lower version n. Again, the application of system 330 identifies or initiates communication to system 335 related to a particular business object. The business object runtime of system 330 performs an initial handshake process with the business object runtime of system 335 to identify the versions and determine the conversion process to be performed. In response to determining that system 330 is associated with a relatively higher version, the business object runtime of system 330 uses a key converter to convert the object key of the requested business object or business object instance into to object key version corresponding to system 335. The first logical key used by system 330 (in a first extended format) is thus transformed in a second logical key used by system 335 (in a second legacy format). The business object runtime can then include that second logical key in the request to the corresponding business object runtime of system 335, where interactions with the identified business object or business object instance are performed. System 335 can return responsive actions and information related to the particular business object or business object instance using the second logical key, where the business object runtime of system 330 can convert that second logical key back into the first logical key prior to providing the information back to the application.

Figure 4:
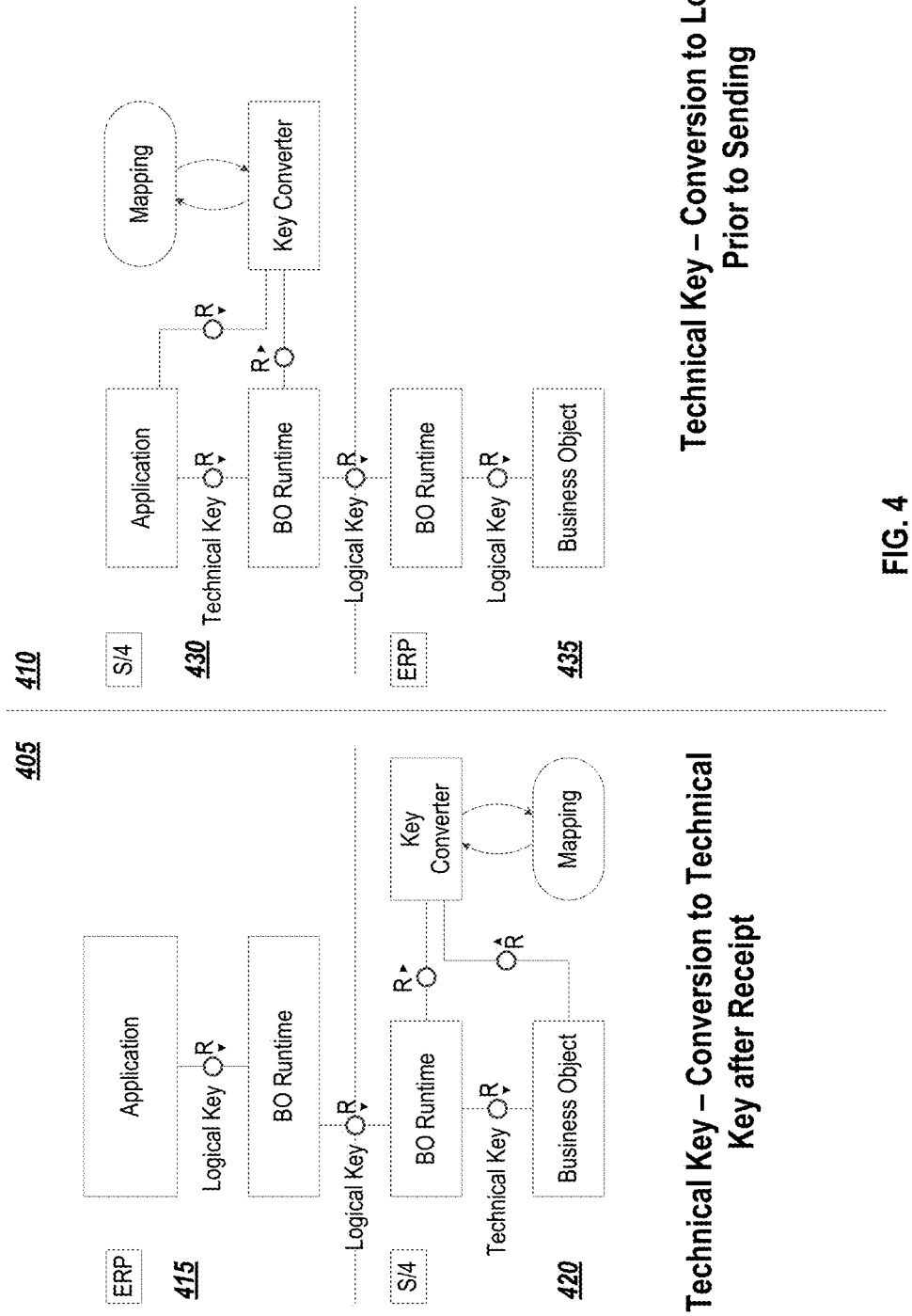
FIG. 4 illustrates a diagram of example operations for converting logical object keys and technical object keys for use between application domains having different key versions, where one of the domains uses a technical key.

FIG. 4 illustrates a diagram of example operations for converting logical object keys and technical object keys for use between application domains having different key versions, where one of the domains uses a technical key. Illustration 405 shows a conversion between a logical key and a technical key, where the conversion occurs at a receiving system—here, an S/4 system with an extended domain—where the sending system is a relatively lower domain system—herein an enterprise resource planning system (ERP). Illustration 410 shows a conversion between a logical key and a technical key, where the conversion occurs at the sending system (i.e., the S/4 system) prior to sending the request to the receiving system (i.e., the ERP system).

In 405, an application from an ERP system 415 (with a relatively lower domain version than the S/4 system 420) initiates a request for a particular business object. The application in the ERP system 415 uses a logical key (i.e., an object key with a fixed length version identifier) to initiate the call. The business object runtime of the ERP system 415 handles the call, and communicates with the business object runtime of the S/4 system 420 (e.g., via a network and one or more API calls between the runtimes). The logical key is provided across system boundaries, and is identified by the business object runtime of the S/4 system 420 as a prior version. In some instances, a similar handshake technique may be performed automatically between the systems, either before the logical key is sent by the ERP system 415 or after the logical key is received at the S/4 system 420.

Once the logical key is received at the S/4 system 420, the business object runtime of the S/4 system 420 provides the logical key to the key converter. Because the object keys of S/4 system 420 have a domain extended past the size restrictions of the maximum size threshold, the key converter identifies the particular technical key in the S/4 system 420 corresponding to the logical key of the ERP system 415 via a mapping table located at or associated with the S/4 system 420. The mapping table may correspond to, for example, the technical key dictionary 170 of FIG. 1. By mapping the logical key to the corresponding technical key of the S/4 system 420, the key converter can instantiate or identify an existing instantiation of the object key. The business object runtime can then instantiate and/or communicate with the corresponding business object instance. Once instantiated, the actual key fields associated with the instantiated business object instance can be used during operations at the S/4 system 420. Once S/4 system 420 operations are complete, the business object instance can be provided back to the key converter for conversion prior to returning responsive information back to the ERP system 415. Two operations can be performed by the key converter—first, the key fields (and their data) associated with the business object instance are associated with the corresponding technical key/GUID in the mapping. Additionally, the business object instance's key fields are converted to the logical key version for the ERP system 415. Once the converted logical key is available, the S/4 system's business object runtime can return the logical key to the ERP system 415 in the proper format of that system.

In the illustration of 410, an application from an S/4 system 430 (with a relatively higher domain version than the ERP system 435) initiates a request for a particular business object or object instance from the ERP system 435. The application in the S/4 system 430 uses a technical key due to an extended set of key fields over and beyond the predetermined size restriction of the object keys. In some instances, the business object runtime can trigger the generation of a technical key from an existing object key or logical key as fields are extended or added to the object key, when those fields extend past the size limit. The key converter can be used to generate new technical keys to be added to a mapping, or technical key dictionary. The mappings can then be used to identify particular business object instances associated with the S/4 system 430. If existing mappings to a particular technical key already exist, the key converter can identify the corresponding business object instance at the S/4 system 430. If no mappings to a business object instance exist, the key converter can generate the new technical key and add that technical key to the mapping or dictionary.

Prior to sending a request to the ERP system 435, the business object runtime of the S/4 system 430 converts the technical key used by the S/4 system in to a logical key corresponding to the ERP system 435. The key converter can identify the appropriate object key format corresponding to the ERP system 435 and generate the converted logical key. The logical key is then passed across system boundaries to the ERP system's business object runtime. The business object runtime can use that logical key to instantiate a new business object instance where no corresponding instance currently exists, or can identify and interact with a previously instantiated business object corresponding to the received logical key.

Once the interactions with the business object instance are complete, the business object runtime of the ERP system 435 can return information associated with the logical key to the business object runtime of the S/4 system 430. The application and business object runtime can operate or interact with the logical key information received back from the ERP system 435. Once completed, information associated with the business object instance and its key fields can be updated by the business object runtime, with updated mappings stored in a technical key dictionary via the key converter as needed.

The illustrations of FIG. 4 are operable only if the technical key used by the S/4 system 420, 430 can be successfully downgraded or reverted to a logical key of a size less than the predefined size restriction. If not, alternative methods of compatibility may be used. In some instances, the S/4 system 420, 430 may be executed in a compatibility mode designed to limit modifications made to particular key fields. Those modifications may allow the key fields to be expanded only to a point where the corresponding object keys are still compatible with at least some of the legacy domains.

Figure 5:
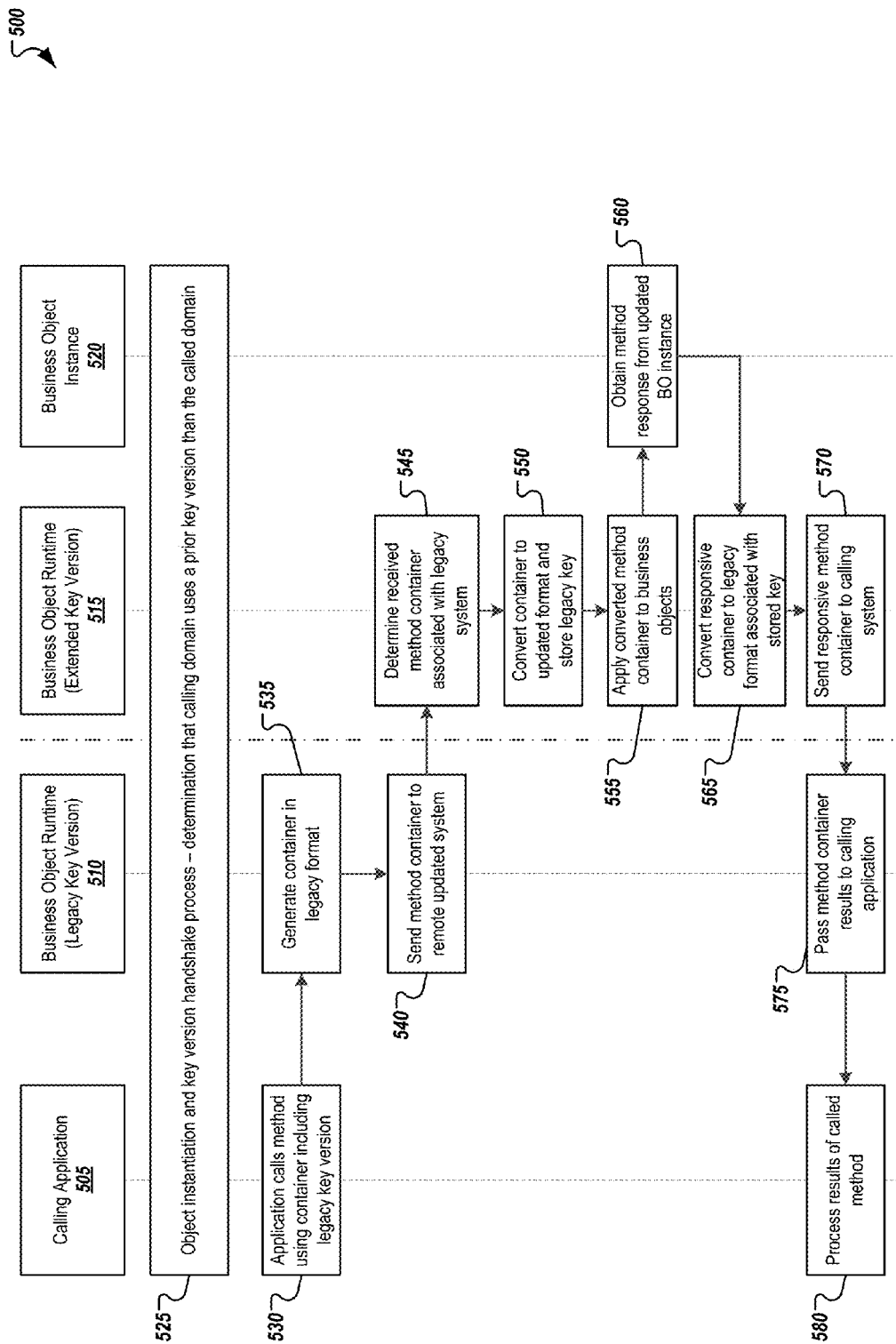
FIG. 5 is a swim lane diagram showing interactions between a calling application, a business object runtime associated with the calling application, a business object runtime associated with a remote system from the calling application, and a set of business objects and business object instances located at the remote system in one example implementation of an example system where the calling application is associated with a legacy key version and the remote system is associated with an updated key version.

FIG. 5 is a swim lane diagram 500 showing interactions between a calling application 505, a business object runtime 510 associated with the calling application, a business object runtime 515 associated with a remote system from the calling application, and a set of business objects and business object instances 520 located at the remote system in one example implementation of an example system where the calling application 505 is associated with a legacy key version and the remote system (corresponding to business object runtime 515) is associated with an extended key version.

At 525, an object instantiation and key version handshake process can be performed. The handshake process can be performed after a determination that a calling application 505 from a first system may be corresponding and interacting with a remote system. During the handshake process, no information as to the particular domain versions between the systems may be known. In other instances, some prior information regarding domain versions may be known, but the handshake process may be performed again to ensure compatibility between the systems. The handshake process can be performed immediately after a request for interactions between the systems, and may be performed directly between the two business object runtimes 510, 515. In the present illustration, the remote system is determined to be an extended domain with an extended key version. As such, the calling application 505 does not need to (and in fact, may be unable) to convert its logical keys into the extended domain format prior to sending a request to the remote system.

At 530, the calling application can call a method or action associated with a particular business object instance using a container based on the legacy key version. The call is passed to the business object runtime 510, which generates a container for passing the method call to the receiving remote system at 535. In general, method containers can include object references (i.e., the object key) along with parameters defining operations and context of the method being called. At 540, the business object runtime of the calling application's system sends or otherwise communicates the method container including the legacy key to the remote extended system.

At 545, the business object runtime 515 of the extended domain system receives the method container and determines that the method container is associated with the legacy system (e.g., based on the contents of the container, information associated with the received call, etc.). Using information related to the legacy format used by the calling system, the business object runtime can, at 550, manage conversion of the method container into a format corresponding to the extended domain of the remote system. The mapping or conversion can be performed by a key converter. The object key used at the remote system may be associated with a technical key and/or an expanded logical key as compared to the calling system. The key converter understands the mapping and can automatically perform the conversion into the proper format. Concurrently or in an associated process, the legacy key can be stored and maintained for responsive communications and interactions.

At 555, the business object runtime 515 can use the converted method container to interact with, act upon, and/or instantiate particular business objects corresponding to the converted key in its extended format. The business object runtime 515 can instantiate business objects that have not been instantiated, or can access and use existing instantiations. At 560, a method response from the particular called or instantiated business object instance 520 can be obtained and returned to or managed by the business object runtime 515. Once the method response is available, the business object runtime 515 can generate a container for passing the method response and business object information back to the calling application 505 at 565. There, the business object runtime 515 can convert the key into the legacy format based on the stored legacy key and/or information on the version used by the calling system. At 570, the responsive method container is sent back to the calling system by the business object runtime 515, where the response is passed to the business object runtime 510 of the calling system (e.g., via one or more APIs used for inter-system communications). At 575, the business object runtime 510 of the calling system can parse the received container and pass the relevant portion of the processed results to the calling application 505. At 580, the calling application 505 can process and use those results of the called method internally, or for further processing/actions.

Figure 6:
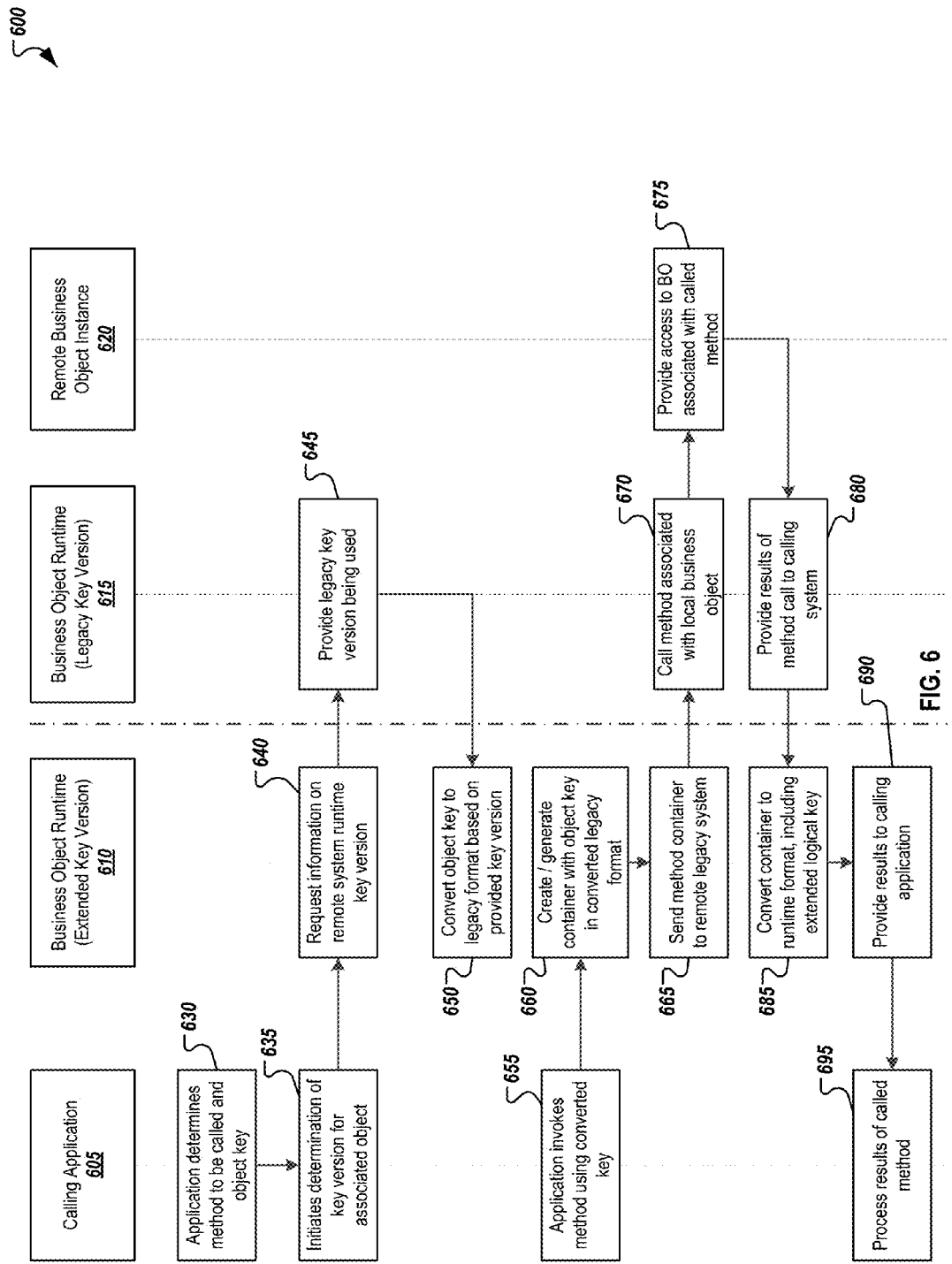
FIG. 6 is a swim lane diagram showing interactions between a calling application, a business object runtime associated with the calling application, a business object runtime associated with a remote system from the calling application, and a set of business objects and business object instances located at the remote system in one example implementation of an example system, where the calling application is associated with an updated key version and the remote system is associated with a legacy key version.

FIG. 6 is a swim lane diagram 600 showing interactions between a calling application 605, a business object runtime 610 associated with the calling system, a business object runtime 615 associated with a system remote from the calling application 605, and a set of business objects and business object instances 620 located at the remote system. In the illustrated system, the calling application 605 is associated with a relatively extended key version as compared to the remote system, which is associated with a legacy key version prior to the extended key version of the calling application 605 and its domain.

At 630, the calling application 605 determines that a method is to be called associated with a particular object key. The object key, as noted, is in a relatively higher version or format as compared to the object keys of the remote system. However, the calling application 605 and its system may not be aware or knowledgeable regarding the version difference at this time. At 635, the calling application 605 can initiate a determination of a key type of the remote system associated with the method to be called. In some instances, this determination may be triggered instead by a business object runtime 610 of the calling system in response to a method call by the calling application 605. Additionally, the determination may also be performed outside of a specific method call in some instances, particularly where two systems are relatively related or where cross-system calls are commonly made. In those instances, a defined relationship and versioning information may be available prior to some or all of the method calls and application interactions, removing this portion of the illustrated process from later method calls. Additionally, after an initial determination, additional determinations may not be necessary and/or performed for a period of time. Returning, at 640, the business object runtime 610 of the calling application 605 requests information from the remote system regarding the remote system's particular key version. At 645, the business object runtime 615 of the called remote system responds to the requested information (or handshake) of the calling system to identify and provide the legacy key version being used by the remote system. The request from the calling system can include its own version information, allowing both systems to evaluate the comparison and determine which system would be performing the key conversions throughout the process. Upon determining here that the calling system is associated with a relatively higher version of the object keys, at 650 the business object runtime 610 can convert the object key used by the calling application 605 into the format of the particular legacy key version identified at 645. If the calling application 605 uses a technical key due to the size restrictions, then at 650 a mapping from a technical key to the corresponding logical key fields of the object key can be made.

At 655, after the object key has been converted and matched to the proper format for the called system, the calling application 605 can invoke the called method. In some instances, the calling application can actually use the converted key provided by the key converter after the initial process in the invocation of 655. In other instances, the calling application 605 may use the extended key version and the business object runtime 610 can handle the conversion of the key. At 660, the business object runtime 610 creates a method container corresponding to the converted legacy key format to be provided to the business object runtime 615 of the called remote system, and that container can be sent across system boundaries at 665.

At 670, the business object runtime 615 of the remote called system can interpret the received method container and call a method associated with a particular locally managed business object instance 620. In some instances, execution and processing of the method container may require the business object runtime 615 to instantiate the business object instance 620 prior to any actions being performed. At 675, the business object runtime 615 is provided access to the business object instance associated with the called method and the legacy logical key, where the results of the action associated with the business object instance 620 are returned to the business object runtime 615. The business object runtime 615 can then, at 680, package and return results of the associated method call to the calling system via the business object runtime 610. At 685, the results are received at the business object runtime 610 and converted into a runtime format for the calling application 605. The runtime format may be the particular extended logical key associated with the calling system's domain. In some instances, the responsive container can be provided back to the calling application 605, where only portions using the legacy logical key are converted to an extended logical key of the calling system at 685. If the calling application 605 uses a technical key, the object key may not be converted back into the technical key for runtime usage. Instead, the extended logical key corresponding to the technical key can be used to allow the calling application 605 to interact with the data and information received from the remote business object instance 620. At 690, the results of the method call can be provided by the business object runtime 610 to the calling application 605, which can process the results within the application at 695.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method for providing compatibility between systems associated with incompatible object key domains, where a first system is associated with a legacy key domain and a second system is associated with an extended key domain relative to the first system, the method executed by a processor and comprising:
   receiving, at the second system and from the first system, a request associated with a business object instance at the second system, wherein the request includes a first logical object key in a legacy format, the first logical key comprising, in a first portion of the logical object key, a fixed length combination comprising a concatenation of one or more key fields associated with the business object instance, the first portion having a maximum allowable length, the one or more key fields uniquely identifying the business object instance, and, the first logical key comprising, in a second portion of the logical object key, a fixed-length version identifier;
   converting, at the second system after receiving the request, the first logical object key from the legacy format into a second object key in an extended format corresponding to the extended key domain of the second system;
   processing, at the second system, the request associated with the business object instance corresponding to the second object key;
   generating, at the second system, a response to the received request based on the processing of the business object instance at the second system, the response including the second object key associated with the business object instance, wherein generating the response includes converting the second object key into the first logical key of the first system prior to sending the response to the received request to the first system; and
   transmitting, by the second system, the generated response to the first system.

2. The method of claim 1, wherein the first logical object key in the legacy format further includes an empty space within the first portion of the logical object key, the empty space available for use in expanding the first logical object key in future object key versions.

3. The method of claim 1, wherein the second object key comprises a modification of the first logical object key, wherein at least one of the key fields of the first logical object key includes additional characters in the extended key domain of the second system.

4. The method of claim 1, wherein the second object key comprises a modification of the first logical object key, wherein at least one new field is added to the key fields of the first logical object key in the extended key domain of the second system.

5. The method of claim 1, wherein the second object key comprises a modification of the first logical key, wherein the modification of the first logical object key comprises an expansion of the key fields in the first portion above the maximum allowable length, wherein the second object key within the second system comprises a technical key, the technical key comprising a globally unique identifier uniquely identifying the key fields as modified in the second system.

6. The method of claim 5, further comprising, in response to the expansion of the key fields in the first portion of the second object key above the maximum allowable length:
   generating a new technical key associated with the expanded second logical object key; and
   storing a mapping of the new generated technical key and the expanded second logical object key in a technical key dictionary.

7. The method of claim 6, wherein converting, at the second system, the first logical object key from the legacy format into a second object key in an extended format corresponding to the extended key domain of the second system, comprises matching the first logical object key from the legacy format with an entry in the technical key dictionary corresponding to the second object key.

8. The method of claim 1, wherein prior to receiving the request from the first system at the second system, the method further comprises:
   performing a handshake operation between the first system and the second system, wherein the handshake operation includes exchanging key domain version information to identify the system with a relatively higher object key version between the first and second systems, wherein the system associated with the relatively higher object key version is to perform conversions between the object keys.

9. The method of claim 1, wherein the request comprises a method container requesting operations of at least one action associated with the business object instance, the method container including the first logical object key of the business object instance and at least one parameter associated with the at least one action.

10. A computer system for providing compatibility between systems associated with incompatible object key domains, where a first system is associated with a legacy key domain and a second system is associated with an extended key domain relative to the first system, the computer system comprising:
    a computer memory; and
    a hardware processor interoperably coupled with the computer memory and configured to perform operations comprising:
       receiving, at the second system and from the first system, a request associated with a business object instance at the second system, wherein the request includes a first logical object key in a legacy format, the first logical key comprising, in a first portion of the logical object key, a fixed length combination comprising a concatenation of one or more key fields associated with the business object instance, the first portion having a maximum allowable length, the one or more key fields uniquely identifying the business object instance, and the first logical key comprising, in a second portion of the logical object key, a fixed-length version identifier;
       converting, at the second system after receiving the request, the first logical object key from the legacy format into a second object key in an extended format corresponding to the extended key domain of the second system;
       processing, at the second system, the request associated with the business object instance corresponding to the second object key;
       generating, at the second system, a response to the received request based on the processing of the business object instance at the second system, the response including the second object key associated with the business object instance, wherein generating the response includes converting the second object key into the first logical key of the first system prior to sending the response to the received request to the first system; and transmitting, by the second system, the generated response to the first system.

11. The system of claim 10, wherein the first logical object key in the legacy format further includes an empty space within the first portion of the logical object key, the empty space available for use in expanding the first logical object key in future object key versions.

12. The system of claim 10, wherein the second object key comprises a modification of the first logical object key, wherein at least one of the key fields of the first logical object key includes additional characters in the extended key domain of the second system.

13. The system of claim 10, wherein the second object key comprises a modification of the first logical object key, wherein at least one new field is added to the key fields of the first logical object key in the extended key domain of the second system.

14. The system of claim 10, wherein the second object key comprises a modification of the first logical key, wherein the modification of the first logical object key comprises an expansion of the key fields in the first portion above the maximum allowable length, wherein the second object key within the second system comprises a technical key, the technical key comprising a globally unique identifier uniquely identifying the key fields as modified in the second system.

15. The system of claim 14, further comprising, in response to the expansion of the key fields in the first portion of the second object key above the maximum allowable length:
generating a new technical key associated with the expanded second logical object key; and
storing a mapping of the new generated technical key and the expanded second logical object key in a technical key dictionary.

16. The system of claim 15, wherein converting, at the second system, the first logical object key from the legacy format into a second object key in an extended format corresponding to the extended key domain of the second system, comprises matching the first logical object key from the legacy format with an entry in the technical key dictionary corresponding to the second object key.

17. The system of claim 10, further comprising, prior to receiving the request from the first system at the second system:
performing a handshake operation between the first system and the second system, wherein the handshake operation includes exchanging key domain version information to identify the system with a relatively higher object key version between the first and second systems, wherein the system associated with the relatively higher object key version is to perform conversions between the object keys.

18. A non-transitory, computer-readable medium storing computer-readable instructions executable by a computer, wherein the instructions provide compatibility between systems associated with incompatible object key domains, where a first system is associated with a legacy key domain and a second system is associated with an extended key domain relative to the first system, the computer-readable instructions executable to:
receive, at the second system and from the first system, a request associated with a business object instance at the second system, wherein the request includes a first logical object key in a legacy format, the first logical key comprising, in a first portion of the logical object key, a fixed length combination comprising a concatenation of one or more key fields associated with the business object instance, the first portion having a maximum allowable length, the one or more key fields uniquely identifying the business object instance, and the first logical key comprising, in a second portion of the logical object key, a fixed-length version identifier;
convert, at the second system after receiving the request, the first logical object key from the legacy format into a second object key in an extended format corresponding to the extended key domain of the second system;
process, at the second system, the request associated with the business object instance corresponding to the second object key;
generate, at the second system, a response to the received request based on the processing of the business object instance at the second system, the response including the second object key associated with the business object instance, wherein generating the response includes converting the second object key into the first logical key of the first system prior to sending the response to the received request to the first system; and
transmit, by the second system, the generated response to the first system.

* * * * *